Oct. 31, 1933.  E. F. LEIN  1,932,790

PLANT SUPPORT

Filed May 19, 1932

INVENTOR
EMIL F. LEIN
BY
ATTORNEY

Patented Oct. 31, 1933

1,932,790

UNITED STATES PATENT OFFICE 1,932,790

PLANT SUPPORT

Emil F. Lein, North Tonawanda, N. Y.

Application May 19, 1932. Serial No. 612,270

3 Claims. (Cl. 47—47)

My invention relates in general to plant supports, and in particular to a wire plant support composed of two or more parts which co-ordinate and interlock to constitute an efficient support.

The principal object of my invention has been to provide a multiple-part plant support which is simple in design; inexpensive to manufacture; and one easy to install.

Another object has been to provide a support so designed that, when in place, it will not interfere with or hamper the work of cultivation of the plant.

Another object has been to provide a device which is so simple in design and compact that it may be shipped by parcel post without wrapping and by freight without being crated.

Other objects have been to provide a support which may be applied at any period of plant life without injury thereto, and one which does not deface or detract from the beauty of the plant being supported.

Moreover, my device is so designed that there are no outwardly projecting ends to catch clothing or the like.

Furthermore, my device is of such a nature that it may be readily disassembled and used again upon the same or other plants.

The above objects and advantages have been accomplished by the device shown in the accompanying drawing, of which:

Figure 1:
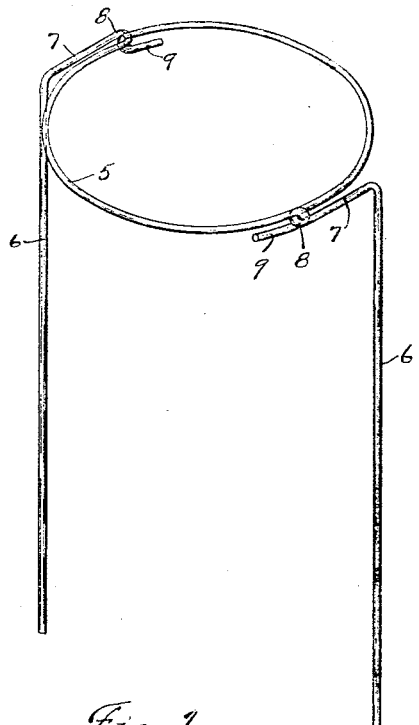
Fig. 1 is a perspective view of my invention.
Figure 3:
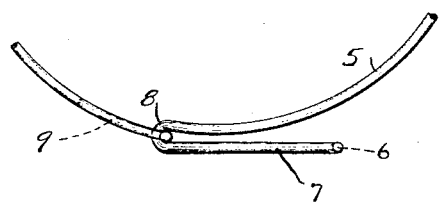
Fig. 3 is an enlarged fragmentary view showing the connection between the two parts of the device.
Figure 4:
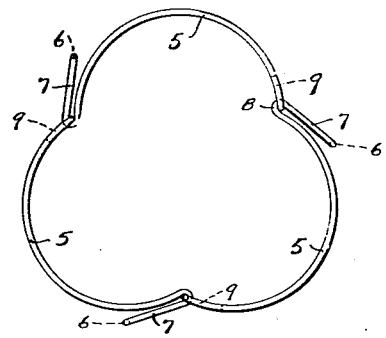
Fig. 4 is a reduced plan view showing my plant support using more than two parts.
Figure 2:
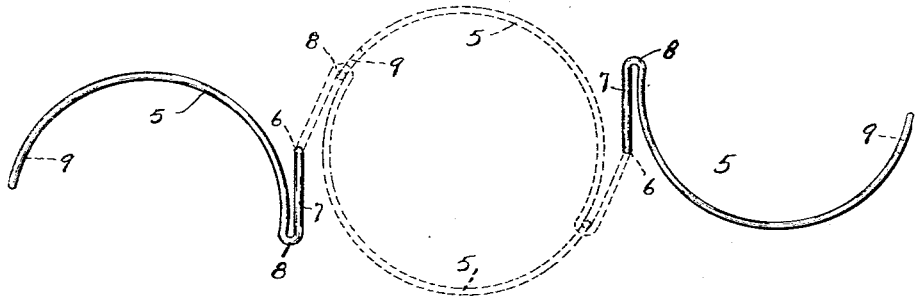
Fig. 2 is a plan view showing a two-part support being assembled.

My invention comprises a support made usually of two parts, as shown in Figs. 1 to 3, the parts, however, being similar and interengageable so that where desired more than two parts may be used as shown in Fig. 4.

Each part comprises a semi-circular, looped portion 5 and a leg portion 6. The leg portion is arranged in a plane at right angles to the looped portion 5 and a horizontal portion 7 is formed at the top of the leg portion and arranged to lie in the same plane as the looped portion 5. The horizontal portion 7 lies adjacent to the convex surface of one end of the semi-circular portion and is in interspaced relation therewith. It is joined to the end of the semi-circular portion by means of a circular bend 8 with which the opposite end of the coacting looped portion of the other part of the support is engageable. As shown in Fig. 3, the horizontal portion is so positioned with respect to the curvature of the looped portion that at a point a slight distance away from the bend 8 the space is less than the diameter of the wire forming the same so that the opposite end of the looped portion of the other part of the support will cause a spreading of the horizontal portion and looped portion as it is engaged and moved to the position where the bend 8 is formed, thus acting as a snap and holding the parts of the support together. By reference particularly to Fig. 3, it will be seen that the horizontal portion 7 and the adjacent part of the looped portion 5 form a very convenient handle for manipulating the part, and since the leg portion 6 is at the end of the horizontal portion 7, the leg portion may be very readily forced into the ground by pressure exerted by the hand on the handle.

At the end of the looped portion 5 opposite to the horizontal portion 7, a return bend portion 9 is provided. This portion is interspaced with respect to the body of the looped portion a distance at least equal to the diameter of the wire so that it may be easily engaged with the coacting part. The length of this portion is such that the complete support will have to be contracted somewhat in order to cause these portions to be engaged. This return bend portion is so bent as to lie underneath the looped portion and in the same circular plane as the looped portion, whereby it may be easily engaged with the bend 8 formed between the horizontal portion 7 and the end of the looped portion of the engaging part of the support. Owing to the provision and position of the return bend portions, the plant being supported will tend to keep the parts of the device in engagement. Since the return bend portions are arranged under the looped portions, my device presents no outwardly projecting ends on which objects may readily be caught.

From the foregoing, and particularly from Fig. 1, it will thus be seen that when my device is used with but two parts, which is preferable, there are but two leg portions to enter the ground and to support the looped portions, whereby there may be little or no interference to cultivation of the plant being supported. The use of a single leg on each part also makes it easy to assemble the device, since it is obvious that an assembled support of the proper size cannot be forced down around the plant which it is to support without danger of breaking or otherwise damaging the plant. However, by having but a single wire, I am able to assemble the device as shown in Fig. 2. As here shown, the parts are located with their looped portions away from the plant to be supported and when in this position the leg portions are properly spaced and then by means of the handles provided by the horizontal parts 7 and the adjacent parts of the ends of the looped portion 5 they are forced downwardly in a vertical plane into the ground to the desired depth. When both parts have thus been placed in the ground, they are both rotated about the leg portions as an axis in a counterclockwise direction until they assume somewhat the position shown in dotted lines in Fig. 2. When in this approximate position, the return bend portion 9 at the free end of each of these looped portions is snapped into engagement with the bend 8 at the opposite end of the other looped portion by being passed between the horizontal portion 7 and the adjacent end of the looped portion 5. As hereinbefore described, the space between the horizontal portion and the looped portion is slightly less than the diameter of the wire forming the parts and the assembled structure will thus be lockingly held together.

When a plant support is needed which is larger than one constructed of two parts, it is possible to use three or even four parts and assemble them as shown in Fig. 4 where three of them are shown in use. Each of the three or more parts is placed in the ground and assembled as described above in connection with the two part structure.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A wire plant support composed of multiple parts, each part comprising a single leg portion, a semi-circular, looped portion, and a horizontal portion connecting the leg portion with the looped portion, the horizontal portion being interspaced with the end of the looped portion and so positioned that the distance between the opposite faces of the horizontal portion and the convex surface of the looped portion shall be slightly less than the diameter of the wire forming the parts, and means carried by the end of each looped portion which is opposite to the horizontal portion for lockingly engaging the other part.

2. A wire plant support composed of multiple parts, each part comprising a single leg portion, a semi-circular, looped portion, and a horizontal portion connecting the leg portion with the looped portion, the horizontal portion being interspaced with the end of the looped portion and so positioned that the distance between the opposite faces of the horizontal portion and the convex surface of the looped portion shall be slightly less than the diameter of the wire forming the parts, the horizontal portion being joined to the end of the looped portion by a bend, and means carried by the opposite end of the other portion for engaging said bend.

3. A wire plant support composed of multiple parts, each part comprising a single leg portion, a semi-circular, looped portion, and a horizontal portion connecting the leg portion with the looped portion and lying in the same horizontal plane as the looped portion, the opposite end of the looped portion being provided with a return bend, such return bend being interspaced with relation to the body of the looped portion and arranged beneath it and in the same circular plane as the circular plane of the looped portion.

EMIL F. LEIN.